United States Patent [19]

Hartsock

[11] Patent Number: 4,524,498
[45] Date of Patent: Jun. 25, 1985

[54] METHOD AND APPARATUS FOR MODIFYING THE COMBUSTION CHAMBER OF AN ENGINE TO ACCEPT CERAMIC LINERS

[75] Inventor: Dale L. Hartsock, Livonia, Mich.

[73] Assignee: Ford Motor Company, Dearborn, Mich.

[21] Appl. No.: 589,936

[22] PCT Filed: Dec. 27, 1983

[86] PCT No.: PCT/US83/02040
§ 371 Date: Dec. 27, 1983
§ 102(e) Date: Dec. 27, 1983

[51] Int. Cl.³ ............................................. B23P 15/00
[52] U.S. Cl. ...................... 29/156.4 WL; 29/156.5 R; 29/525; 29/401.1; 29/527.5; 92/212; 92/213; 92/224; 92/231; 123/193 P; 123/193 C; 123/669
[58] Field of Search ............... 29/156.4 WL, 156.4 R, 29/156.5 R, 527.5, 401.1, 525; 92/212, 213, 224, 231; 123/193 P, 668, 669, 193 C

[56] References Cited

U.S. PATENT DOCUMENTS

| | | | |
|---|---|---|---|
| 1,559,439 | 10/1925 | Kapraun | 92/212 X |
| 1,820,878 | 8/1931 | Wyckoff | 123/668 |
| 2,478,294 | 8/1949 | Madsen | 92/212 |
| 3,033,183 | 5/1962 | Erickson | 123/193 C X |
| 3,082,752 | 3/1963 | Thomas | 123/668 |
| 3,315,651 | 4/1967 | Dangauthier | 123/193 C X |
| 3,800,751 | 4/1974 | Glessey et al. | 123/193 C X |
| 3,882,841 | 5/1975 | Silverstein | 29/156.5 R X |
| 4,245,611 | 1/1981 | Mitchell et al. | 123/669 |
| 4,341,826 | 7/1982 | Prewo et al. | 123/193 R X |
| 4,389,921 | 6/1983 | Bush | 29/156.4 WL X |
| 4,404,935 | 9/1983 | Kraft | 123/193 P |

FOREIGN PATENT DOCUMENTS

| | | | |
|---|---|---|---|
| 2729230 | 1/1979 | Fed. Rep. of Germany | 123/191 A |
| 159753 | 4/1933 | Italy | 123/668 |
| 19903 | 2/1980 | Japan | 29/156.4 WL |
| 305333 | 2/1929 | United Kingdom | 123/191 A |
| 321145 | 10/1929 | United Kingdom | 123/191 A |

*Primary Examiner*—Howard N. Goldberg
*Assistant Examiner*—Ronald S. Wallace
*Attorney, Agent, or Firm*—Joseph W. Malleck; Olin B. Johnson

[57] ABSTRACT

A method is disclosed of modifying a conventional internal combustion engine to accept ceramic material. A cast iron extension mamber is metallurgically joined to the cast iron engine block, the extension member having a wall defining a bore opening aligned with and larger than the bore opening of the engine block. The extension member has a height substantially equal to or greater than the axial stroke of the piston. The diameter of the upper portion of the wall, defining the bore opening in the engine block, is enlarged to define an annular shoulder; the shoulder has an outer surface substantially axially aligned with the wall defining the bore opening in the extension member. A cylindrical ceramic liner, such as zirconia or alumina, is attached within the wall of the bore opening of the extension member by use of a high strength metallic sleeve which is fitted along the outer surface of the shoulder. The ceramic liner has an internal surface aligned with the wall of the bore opening in the engine block. A metallic cap (comprised of stainless steel or cast iron) is attached to the top of the piston, the cap carrying a ceramic facing. The cap has an effective height commensurate with the effective height of the extension member. The cap defines a trapped air space between the ceramic facing and piston, and the cap has its side wall aligned with the side wall of the piston.

22 Claims, 1 Drawing Figure

METHOD AND APPARATUS FOR MODIFYING THE COMBUSTION CHAMBER OF AN ENGINE TO ACCEPT CERAMIC LINERS

TECHNICAL FIELD

The invention relates to the art of making internal combustion engine components using ceramic as insulating elements.

BACKGROUND OF THE INVENTION AND PRIOR ART STATEMENT

Cylinder walls and hot surfaces of the head for an internal combustion engine have been lined with ceramic based materials to improve the insulating quality of the engine housing. For example, in U.S. Pat. No. 4,341,826, the art teaches the manufacture of engine parts formed from silicon carbide fiber-reinforced ceramic or glass mixtures. Essentially, the ceramic is used as a liner for the cylinder walls as well as for the hot surface of the head, and may even be used for the top surface of the piston; these surfaces represent the critically heated surfaces of a combustion chamber for a typical internal combustion engine. As another example, in U.S. Pat. No. 4,245,611, aluminum pistons have been coated with ceramic to improve the insulating quality of the hot top surface of the piston.

The above prior art approaches have not been entirely successful because (a) metallic sealing rings, carried by the piston, are unable to properly seal against ceramic when used as a liner for the cylinder walls, and (b) the hot surfaces of an aluminum piston are insufficiently insulated when ceramic is coated onto the piston, unless such coating is extremely thick, which fact contributes to cracking and differential thermal expansion problems associated with the supporting aluminum piston.

What is needed is a method by which existing or conventional internal combustion engine housings can be modified to accept ceramic insulating members, whereby the sealing rings of the piston continue to bear against metallic cylinder walls and the insulating quality of ceramic is not damaged by use on the piston.

SUMMARY OF THE INVENTION

The invention is a method of modifying a conventional internal combustion engine to accept ceramic and the resulting modified apparatus. The engine has a conventional engine block with a wall defining a bore opening, an engine head, and a piston in the bore opening, the piston having a top and sealing rings which together cooperate with the engine block and head to define a combustion chamber. The steps of the method comprise: (a) joining an extension member to the engine block, the extension member having a wall defining a bore opening aligned with but larger than the bore opening of the engine block, the extension member having a height equal to or greater than a substantial portion of the axial stroke of the piston; (b) enlarging the diameter of the uppor portion of the wall in the engine block defining a bore opening to form an annular shoulder having a radially outer surface substantially axially aligned with the wall of the extension member defining a bore opening; (c) securing a cylindrical ceramic liner commonly along both said wall of the extension member and the radially outer surface of said shoulder in said block, said liner being comprised of a material having a coefficient of thermal expansion differing from the coefficient of thermal expansion of the block by up to about $2.0 \times 10^{-6}$ in/in/°F.; and (d) attaching a cap to the top of the piston to extend the effective piston top a distance commensurate with the effective height of the extension member.

Preferably, a metallic sleeve is press-fitted between the cylindrical ceramic liner and the wall of the extension member, the metallic sleeve being comprised of material having a tensile strength of at least 100,000 psi and coefficient of thermal expansion intermediate that of the material for the ceramic sleeve and extension member. Advantageously, the metallic sleeve is comprised of the 400 series of stainless steel, the ceramic liner is comprised of a material selected from zirconia and alumina, and the extension member and block are each comprised of cast iron.

Preferably, the cap carries a ceramic facing and the cap defines a trapped air space between the ceramic facing and the piston. The cap is preferably comprised of a material having a coefficient of thermal expansion differing from the coefficient of thermal expansion of the ceramic facing by up to about $2.0 \times 10^{-6}$ in/in/°F. The cap preferably is secured in a manner to have a side wall aligned with the side of the piston.

Advantageously, the ceramic facing and ceramic liner have a thickness no greater than 0.75 inch, optimally 0.5 inch. The height of the extension member is varied to promote a desired change in the insulating quality of the combustion chamber.

Preferably, the sealing rings of the piston each continue to engage the same portion of the engine block as previously. The secured liner and attached cap facilitate raising the peak operating temperature of the combustion chamber by at least 100° F. during engine operation.

The air gap trapped between the ceramic facing and piston preferably has a height dimension of about 0.05–3.0 inches and a diameter of at least 75% of the piston diameter.

The apparatus of this invention essentially comprises: an engine housing have a block with a wall defining a bore opening, an engine head, and a piston in the bore opening, the piston having a top and sealing rings cooperating to define a combustion chamber with said block and head, said block wall having an annular groove at its upper end enlarging said bore opening, said groove defining a radially outer cylindrical surface; (b) an extension member joined to said block having a wall defining a bore opening aligned with but larger than the bore opening of the block, said extension member wall being substantially axially aligned with said radially outer cylindrical surface of said block; (c) a ceramic liner secured along said wall of the extension member and along said radially outer cylindrical surface of said block, said liner being comprised of a material having a coefficient of thermal expansion differing from the coefficient of thermal expansion of the block by up to about $2.0 \times 10^{-6}$ in/in/°F.; (d) a cap attached to said piston to extend the effective piston top a distance commensurate with the effective height of the extension member.

SUMMARY OF THE DRAWINGS

The FIGURE is a central sectional elevational view of an internal combustion engine with a piston operative within an engine housing, the engine being modified in accordance with the invention herein.

BEST MODE FOR CARRYING OUT THE INVENTION

Figure 1:
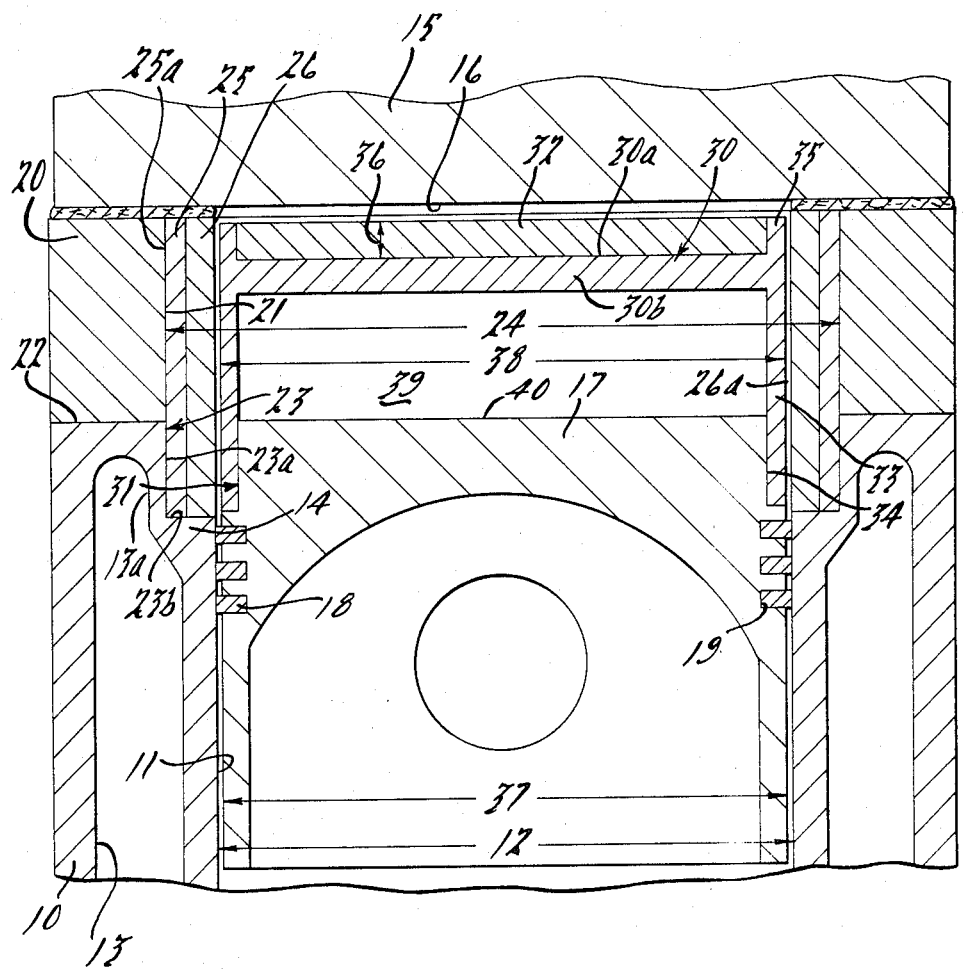

The invention is a method of modifying a conventional internal combustion engine to accept ceramic material, to more effectively insulate the combustion chamber thereof, and to increase engine efficiency. The conventional parts of an engine, as shown in FIG. 1, comprise an iron based engine block 10 having a wall defining a cylindrical bore operning 11 with a predetermined internal diameter 12. The block 10 has internal cooling channels 13 located to extend about the bore opening 11 and along the axial extent of the block 10. Preferably, the cooling channel 13 is narrowed at an upper neck 13a to provide for increased metal adjacent the upper shoulder 14 of the wall of the bore opening 11. The head 15 of the engine is a metallic member (such as aluminum) providing a surface 16 extending over the bore opening 11 of the engine block.

The piston 17 is operatively carried in the bore opening 11 for reciprocation between a bottom and a top position which defines an axial stroke. The piston carries annular split sealing rings 18 which together cooperate with the engine block 10 and head 15 to define a combustion chamber. The bottom reciprocating position of the piston defines the maximum volume for the combustion chamber and the upper position defines its smallest compressed volume. The piston 17 is conventionally made of aluminum or aluminum alloy and the split sealing rings 18, received in grooves 19, ride in sliding interengagement with the internal surface 11 of the bore of the engine block.

Block Modification

The existing cast iron engine block 10 is modified by first metallurgically joining a cast iron extension member 20 at 22 thereto. The extension member 20 has a wall defining a bore opening 21 aligned with and larger than the corresponding wall defining the bore opening 11 in the engine block, as shown in FIG. 1. The bore opening 21 of the extension member 20 has a diameter larger than the diameter of bore opening 11 by a dimension in the range of 0.2–1.0 inch. The extension block has a height equal to or greater than a substantial portion of the axial stroke of the piston. The extension block is preferably joined to the existing block by brazing.

The assembly of the extension block 20 and engine block 10 is then subjected to a machining operation, whereby the diameter of the upper portion of the wall of the bore opening 11 for the engine block is enlarged to a diameter 24 creating a shoulder 23 having a radially outer surface 23a substantially axially aligned with the wall of the bore opening 21 of the extension member and a radially extending flat surface 23b. The depth of the shoulder 23 is within the range of 0.5–1.0 inch, but limited so that the piston rings 18 do not encounter the space of the shoulder during piston stroke.

A solid metal sleeve 25 (preferably comprised of 400 series stainless steel) is fitted in and against the shoulder 23, having its outer surface 25a shrunk or press fit against wall 21 and surface 23a. A ceramic cylinder or sleeve 26 is snuggly inserted within the sleeve 25; the ceramic cylinder 26 is sized to have its internal wall or surface 26a coincident or axially aligned with the internal wall or surface of the bore opening 11.

The ceramic cylinder is comprised of a material having a coefficient of thermal expansion which is high for ceramics and accordingly is selected from alumina and zirconia to provide a coefficient of thermal expansion of $5.0$–$5.6 \times 10^{-6}$ in/in/°F. The coefficient of thermal expansion for the ceramic sleeve should not differ from the coefficient of thermal expansion of its supporting member by no greater than $2.0 \times 10^{-6}$ in/in/°F. The direct supporting member, here the sleeve 25, is preferably comprised of 400 series stainless steel having a coefficient of thermal expansion of about $5.6 \times 10^{-6}$ in/in/°F. In certain cases, it is possible to station the ceramic sleeve directly on the cast iron extension member, provided the design of the block inhibits high temperatures in the mass of material residing between adjacent bores. This cannot be done in most cases and thus it is necessary to use a metal sleeve 25 between the ceramic sleeve and cast iron extension member to relieve thermal stresses. Although 400 series stainless steel has a coefficient of thermal expansion ($5.6 \times 10^{-6}$ in/in/°F.) only slightly lower than cast iron ($6.4 \times 10^{-6}$ in/in/°F.), the stainless steel has a considerably higher tensile strength (about 130,000 psi) as opposed to a tensile strength of only about 30,000 psi for cast iron. The stronger stainless steel sleeve will hold the ceramic sleeve in compression during engine operation, counteracting the stresses of the block to crack the ceramic. This phenomenon is particularly prevalent at zones between adjacent bores where the mass of material of the block is very thin and accordingly the metal temperatures become much higher.

The height of the extension member can be varied to promote a desired change in the insulating quality of the ceramic sleeve and thereby of the combustion chamber. The height of the extension member should be such to permit the sealing rings, carried by the piston, to continue to slidingly engage a portion of the existing block 10 which is cooled by channels 13.

Piston Modification

A metallic extension cap 30 is attached to the top portion of the piston 17 at 31. The cap supports a ceramic facing or disc 32 in a recess on its upper face 30a. The ceramic for the facing is selected from the group consisting of zirconia and alumina; the ceramic facing has a thickness 36 no greater than 0.75 inch. The cap is constructed to have a cylindrical wall 33 extending down along and overlapping the side wall of the piston. The cap also has an annular lip 35 defining the recessed opening for the ceramic facing. The wall 33 is attached to a reduced or necked portion 34 of the piston so that its outer diameter 38 is commensurate with the outer diameter 37 of the piston. When installed in the position as shown in FIG. 1, the piston extension cap defines a trapped air gap 39 between the web 30b of the cap and the upper end face 40 of the existing piston. The cap has a height which is commensurate with the height of the extension block member, facilitating a gap 39 with a height of 0.05–3.0 inches and a diameter of 75–98% of the piston diameter.

I claim:

1. A method of modifying a conventional internal combustion engine to accept ceramic, said engine having an engine block with a wall defining a bore opening, an engine head, and a piston in said bore opening, the piston having a top and sealing rings which together cooperate with the engine block and head to define a combustion chamber, comprising:

(a) joining an extension member to said engine block, said extension member having a wall defining a bore opening aligned with but larger than the bore opening of the engine block;

(b) enlarging the diameter of the upper portion of said wall in the engine block defining a bore opening to form an annular shoulder with a radially outer surface substantially axially aligned with said wall of the extension member defining a bore opening;

(c) securing a cylindrical ceramic liner commonly along both said wall of the extension member and the radially outer surface of said shoulder in said block, said liner being comprised of a material having a coefficient of thermal expansion differing from the coefficient of thermal expansion of the block by up to $2.0 \times 10^{-6}$ in/in/°F.; and (d) attaching a cap to the top of the piston to extend the effective piston top a distance commensurate with the effective height of the extension member.

2. The method as in claim 1, in which the height of said extension member is commensurate with the axial stroke of said piston.

3. The method of claim 1, in which a metallic sleeve is press fitted into the bore formed during the enlarging step and is followed by securement of said cylindrical ceramic liner within said metallic sleeve, said metallic sleeve being comprised of a material having a tensile strength of at least 100,000 psi and a coefficient of thermal expansion intermediate that of the material for the ceramic sleeve and extension member.

4. The method of claim 3, in which said metallic sleeve is comprised of 400 series stainless steel.

5. The method as in claim 1, in which said ceramic liner is comprised of a material selected from alumina and zirconia and said engine block and extension member are each comprised of cast iron.

6. The method as in claim 1, in which said cap is formed to carry a ceramic facing, the cap defining a trapped air space between the ceramic facing and the piston, said cap being comprised of a material having a coefficient of thermal expansion differing from the coefficient of thermal expansion of the ceramic facing by up to about $2.0 \times 10^{-6}$ in/in/°F.

7. The method as in claim 6, in which said cap is secured in a manner to have a side wall aligned with the side of said piston.

8. The method as in claim 1, in which said extension member is metallurgically joined to said engine block.

9. A method of modifying a conventional internal combustion engine to accept ceramic, said engine having an engine block with a wall defining a bore opening, an engine head, and a piston in said bore opening, the piston having a top and sealing rings which together cooperate with the engine block and head to define a combustion chamber, comprising:

(a) joining an extension member to said engine block, said extension member having a wall defining a bore opening aligned with but larger than the bore opening of said engine block, said extension member having a height equal to or greater than a substantial portion of the axial stroke of the piston;

(b) enlarging the diameter of the upper portion of the wall in the engine block defining a bore opening to form an annular shoulder having a radially outer surface substantially axially aligned with the wall of the extension member defining a bore opening;

(c) securing a cylindrical ceramic liner commonly along both said wall of the extension member and the radially outer surface of said shoulder in said block, said cylindrical ceramic liner having a radially inner surface aligned with the wall of the block defining a bore opening; and (d) attaching a cap with a ceramic facing to the top of said piston, the cap having an effective height to carry the ceramic facing above the piston a distance commensurate with the effective height of said extension member, said cap defining a trapped air space between the ceramic facing and said piston.

10. The method as in claim 9, in which said cap is secured in a manner to have a side wall aligned with said piston side.

11. The method as in claim 9, in which said ceramic facing and ceramic liner have a thickness no greater than 0.75 inch.

12. The method as in claim 9, in which the height of said block extension member is varied to promote a desired change in the insulating quality of the combustion chamber.

13. The method as in claim 9, in which sealing rings of said engine piston at its top dead center position, each continue to engage only said engine block.

14. The method as in claim 9, in which said secured liner and attached cap facilitate raising the peak operating temperature of the combustion chamber by at least 100° F. during engine operation.

15. The method as in claim 9, in which the trapped space between said ceramic facing and piston has a height dimension of 0.05–3.0 inches and a diameter of at least 75% of the diameter of said piston.

16. A conventional engine apparatus modified to accept ceramic facing material, comprising:

(a) an engine housing have a block with a wall defining a bore opening, an engine head, and a piston in the bore opening, the piston having a top and sealing rings cooperating to define a combustion chamber with said block and head, said block wall having an annular groove at its upper end enlarging said bore opening, said groove defining a radially outer cylindrical surface;

(b) an extension member joined to said block having a wall defining a bore opening aligned axially with but larger than the bore opening of the block, said extension member wall being substantially axially aligned with said radially inner cylindrical surface of said bore opening of said block;

(c) a ceramic liner secured along said wall of the extension member and along said radially outer cylindrical surface of said block, said liner being comprised of a material having a coefficient of thermal expansion differing from the coefficient of thermal expansion of the block by up to about $2.0 \times 10^{-6}$ in/in/°F.; and (d) a cap attached to said piston to extend the effective piston top a distance commensurate with the effective height of the extension member.

17. The apparatus as in claim 16, in which the height of said extension member is commensurate with the axial stroke of said piston.

18. The apparatus as in claim 16, in which a metallic sleeve is press fitted into the bore formed during the enlarging step and is followed by securement of said cylindrical ceramic liner within said metallic sleeve, said metallic sleeve being comprised of a material having a tensile strength of at least 100,000 psi and a coefficient of thermal expansion intermediate that of the material for the ceramic sleeve and extension member.

19. The apparatus as in claim 18, in which said metallic sleeve is comprised of 400 series stainless steel.

20. The apparatus as in claim 16, in which said ceramic liner is comprised of a material selected from alumina and zirconia and said engine block and extension member are each comprised of cast iron.

21. The apparatus as in claim 16, in which said cap is formed to carry a ceramic facing, the cap defining a trapped air space between the ceramic facing and the piston, said cap being comprised of a material having a coefficient of thermal expansion differing from the coefficient of thermal expansion of the ceramic facing by up to about $2.0 \times 10^{-6}$ in/in/°F.

22. The apparatus as in claim 21, in which said ceramic facing and ceramic liner have a thickness no greater than 0.75 inch.

* * * * *